(12) United States Patent
Kimura

(10) Patent No.: US 7,495,939 B2
(45) Date of Patent: Feb. 24, 2009

(54) RIPPLE FILTER CIRCUIT

(75) Inventor: Hiroyuki Kimura, Sendai (JP)

(73) Assignee: Freescale Semiconductor, Inc., Austin, TX (US)

( * ) Notice: Subject to any disclaimer, the term of this patent is extended or adjusted under 35 U.S.C. 154(b) by 323 days.

(21) Appl. No.: 11/557,388

(22) Filed: Nov. 7, 2006

(65) Prior Publication Data

US 2007/0103838 A1      May 10, 2007

(30) Foreign Application Priority Data

Nov. 7, 2005   (JP) .............................. 2005-322673

(51) Int. Cl.
*H02M 1/14* (2006.01)
(52) U.S. Cl. ........................................................ 363/46
(58) Field of Classification Search ................. 333/181; 363/46
See application file for complete search history.

(56) References Cited

U.S. PATENT DOCUMENTS

| | | | | |
|---|---|---|---|---|
| 4,327,319 A | * | 4/1982 | Swisher et al. | 323/303 |
| 4,341,990 A | * | 7/1982 | Davis | 323/303 |
| 4,594,648 A | * | 6/1986 | Gallios | 363/46 |
| 4,710,861 A | * | 12/1987 | Kanner | 363/46 |
| 6,489,755 B1 | * | 12/2002 | Boudreaux et al. | 323/282 |

* cited by examiner

*Primary Examiner*—Jeffrey L Sterrett
(74) *Attorney, Agent, or Firm*—Charles Bergere

(57) ABSTRACT

A ripple filter circuit for ensuring the driving of a driving subject while efficiently eliminating ripple even when the operational voltage margin is small. A first transistor, which is connected to a power supply voltage line, is connected to a ground line via a load of the driving subject. A second transistor, which has substantially the same characteristics as the first transistor, and a dummy load are arranged between the power supply voltage line and the ground line. An operational amplifier includes an inverting input terminal, connected between the second transistor and the dummy load, and a non-inverting terminal at which the voltage is decreased by a predetermined voltage from the power supply voltage. The operational amplifier also includes an output connected to the gate terminal of the second transistor and to the gate terminal of the first transistor via a lowpass filter.

6 Claims, 2 Drawing Sheets

RIPPLE FILTER CIRCUIT

BACKGROUND OF THE ART

The present invention relates to a ripple filter circuit for eliminating ripple from, for example, a power supply circuit.

A ripple circuit known in the prior art functions to eliminate ripple (refer to, for example, Japanese Laid-Open Patent Publication No. 8-317633, FIG. 2). The structure of a ripple filter circuit will now be described with reference to FIG. 3A. A bipolar transistor BT is arranged in a power supply voltage VCC line. The bipolar transistor BT forms a ripple filter circuit, which is grounded via a load L functioning as a driving subject. A lowpass filter LPF is connected to the base terminal of the bipolar transistor BT. The lowpass filter LPF includes a resistor and a capacitor. Power is supplied from the power supply voltage VCC line to the base terminal of the bipolar transistor BT via the resistor. Further, the base terminal is connected to a ground GND line via the capacitor.

As long as the base voltage at the bipolar transistor BT is constant, the output voltage VOUT remains constant even if the power supply voltage VCC fluctuates. In this case, the drop voltage Vdrop, which is the difference between the power supply voltage VCC and the output voltage VOUT, is equal to the base-emitter voltage VBE in the bipolar transistor BT and thus the equation of Vdrop=VCC−VOUT=VBE is satisfied. Voltage from which high frequency components are eliminated by the lowpass filter LPF is applied to the base terminal of the bipolar transistor BT. Thus, even if ripple is included in the power supply voltage VCC, the power supply voltage VOUT is not affected by the ripple and is thus maintained at a predetermined value. However, in this case, the variation width in the base-emitter voltage VBE is small. Thus, the drop voltage Vdrop cannot be greatly changed.

A MOS transistor may be used in lieu of the bipolar transistor BT shown in FIG. 3A. More specifically, power supply voltage VCC is supplied to the gate terminal of the MOS transistor via the resistor of the lowpass filter LPF. Further, the gate terminal of the MOS transistor is grounded via the capacitor. The power supply voltage VCC is supplied to the drain terminal, and the voltage at the source terminal serves as the output voltage VOUT. In this state, the drop voltage Vdrop is equal to the gate-source voltage VGS of the MOS transistor. In comparison with when using the bipolar transistor BT, the variation width in the gate-source voltage VGS may be changed greatly. Thus, the drop voltage Vdrop may be changed greatly.

The ripple filter circuit eliminates ripple that is smaller than the drop voltage Vdrop. Thus, when the ripple that is to be eliminated is large, the drop voltage Vdrop must be increased. In such a case, a resistor is connected parallel to the capacitor of the lowpass filter in the ripple filter circuit (refer to, for example, Japanese Laid-Out Patent Publication No. 7-253565, FIG. 4).

In this case, when the resistor connected in series to the capacitor is represented by R1 and the resistor connected in parallel to the capacitor is represented by R2, the output voltage VOUT becomes lower by Vd1=VCC×(R1/(R1+R2)). That is, the drop voltage Vdrop may be equalized with the sum of the base emitter voltage VBE and the voltage Vd1 (Vdrop=VBE+Vd1). In this case, the output voltage VOUT is decreased by voltage Vd1 but the drop voltage Vdrop is increased by the voltage Vd1. This removes noise that is large.

A ripple filter circuit used in an active inductor for a circuit operated by a low power supply voltage is also known in the art (refer to, for example, Japanese Laid-Open Patent Publication No. 2001-257318, FIG. 1). FIG. 3B shows a schematic diagram of the ripple filter circuit. In this case, to operate the transistor M, the voltage at the gate terminal is increased to be higher than the voltage at the source terminal of the transistor M. Thus, by employing a power supply to apply voltage VG to the power supply voltage VCC line, voltage obtained by adding the voltage VG to the power supply voltage VCC is applied as the input voltage of the lowpass filter LPF. Accordingly, the drop voltage may be decreased by increasing the gate voltage at the transistor M1 and raising the output voltage VOUT. This ripple filter circuit is optimal when the noise is small noise or when the operational voltage margin is small.

In such a ripple filter circuit, the target drop voltage Vdrop is smaller compared to the gate-source voltage VGS and the base-emitter voltage VBE. However, changes in the temperature or variations in the manufacturing process vary the voltage-current characteristic of the transistor as shown in FIG. 4. In FIG. 4, voltage range D shows the characteristic variation range of a depression type MOS transistor, and voltage range E shows the characteristic variation range of an enhancement type MOS transistor. In this case, the voltage ranges (D and E) of the characteristic variation of the MOS transistors cannot be ignored.

For example, when decreasing the drop voltage Vdrop with the voltage VG as described above, the characteristic variation voltage range of the transistor increases relative to the target drop voltage Vdrop. Thus, it becomes difficult to ensure the operation of a driving subject having a small operational voltage margin. Further, when the drop voltage Vdrop becomes smaller than the target value, the elimination of certain noise may be hindered.

SUMMARY OF THE INVENTION

It is an object of the present invention to provide a ripple filter circuit that efficiently eliminates ripple and ensures that a driving subject is driven even when the operational voltage margin is small.

One aspect of the present invention is a ripple filter circuit for eliminating ripple. The ripple filter circuit includes a driving transistor, connected to a power supply line, for supplying output voltage to a driving subject connected to a ground line. A reference transistor and a dummy load are connected in series between the power supply line and the ground line. The reference transistor functions as a replica of the driving transistor, and the dummy load corresponds to load of the driving subject. A compensation circuit, connected to a gate terminal of the reference transistor, cancels a characteristic variation in the reference transistor. The compensation circuit provides its output to a gate terminal of the drive transistor via a lowpass filter.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described with reference to FIG. 1. A depression type MOS transistor is used in the first embodiment.

Figure 1:
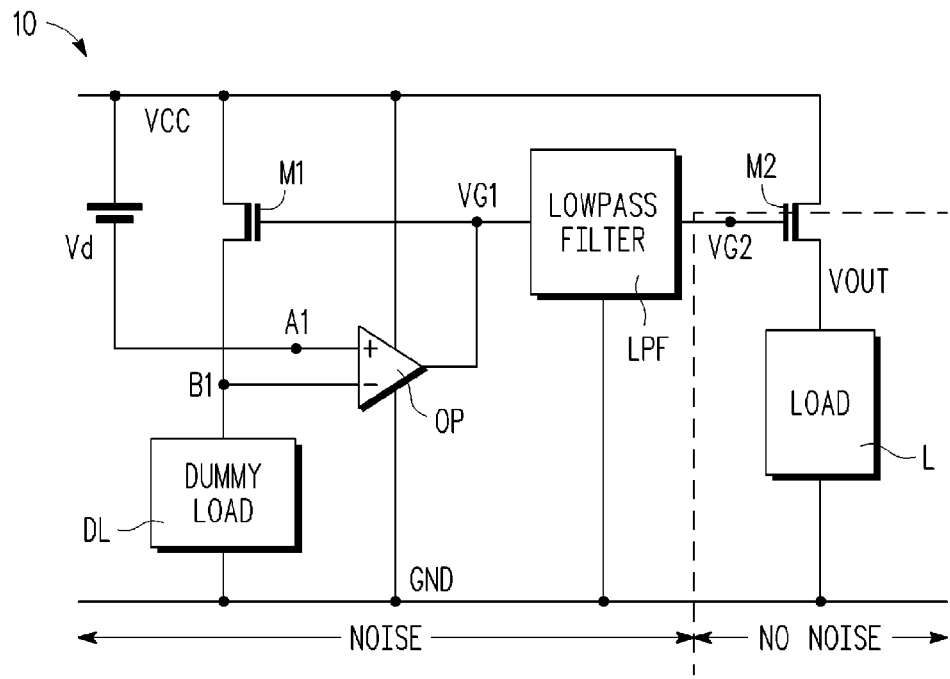
FIG. 1 is a circuit diagram of a ripple filter circuit according to a first embodiment of the present invention.

As shown in FIG. 1, a transistor M2 is connected to a power supply voltage VCC line of a ripple filter circuit 10. The transistor M2 functions as a driving transistor for controlling the supply of power. In the present embodiment, an N-channel depression type MOS transistor is used as the transistor M2. The voltage at the output terminal of the transistor M2 functions as the output voltage VOUT. A load L of a driving subject is connected between the transistor M2 and ground GND.

A transistor M1, which functions as a reference transistor, and a dummy load DL are connected in series between the power supply voltage VCC line and ground GND line. The transistor M1 and the dummy load DL function as replicas of the transistor M2 and the load L. The transistor M1, which is smaller in size than the transistor M2, is formed by an N-channel depression type MOS transistor and has substantially the same characteristics as the transistor M2. The transistor M1 is formed near the transistor M2. The dummy load DL realizes with the transistor M1 a voltage relationship that is the same as that between the transistor M2 and the load L. More specifically, the ratio of the current flowing through the transistor M1 with respect to the current flowing through the transistor M2 is equal to the current flowing through the dummy load DL with respect to the load L. In this case, the current flowing through the transistor M1 is less than the current flowing through the transistor M2.

An inverting input terminal B1 of an operational amplifier OP is connected between the transistor M1 and the dummy load DL. The operational amplifier OP includes a power supply terminal connected to the power supply voltage VCC line, a ground terminal connected to the ground GND line, and a non-inverting input terminal A1 connected to the power supply voltage VCC line via a drop voltage setting power supply for voltage Vd.

The drop voltage setting power supply for voltage Vd has a high voltage side connected to the power supply voltage VCC line. Thus, voltage lower than power supply voltage VCC by the voltage Vd is input to the non-inverting input terminal A1 of the operational amplifier OP. The operational amplifier OP also includes an output terminal connected to the gate terminal VG1 of the transistor M1. Thus, the output of the operational amplifier OP undergoes negative feedback via the transistor M1. As a result, the operational amplifier OP operates to equalize the voltage at the non-inverting input terminal A1 with the voltage at the inverting input terminal B1. As described above, the dummy load DL realizes with the transistor M1 the voltage relationship that is the same as that between the transistor M2 and the load L. Thus, unless there is a potential difference between the input and output sides of the lowpass filter LPF (between the gate terminals VG1 and VG2), the voltage at the inverting input terminal B1 becomes equal to the voltage between the transistor M1 and the load L, that is, the output voltage VOUT. Accordingly, the voltage Vd determines the output voltage VOUT.

The gate terminal VG1 of the transistor M1 is connected to the gate terminal VG2 of the transistor M2 via the lowpass filter LPF. A filter including, for example, a resistor and a capacitor may be used as the lowpass filter LPF. More specifically, the resistor has two terminals respectively connected to the gate terminals VG1 and VG2. The capacitor has one terminal that is grounded and another terminal connected to the resistor and the gate terminal VG2. In this case, the current flowing between the gate terminals VG1 and VF2 is subtle. Thus, the potential difference between the gate terminals VG1 and VG2 is subtle.

The operation of the ripple filter circuit 10 will now be discussed.

As described above, the operational amplifier OP controls the voltage at the gate terminal VG1 of the transistor M1 so as to eliminate the potential difference between the non-inverting input terminal A1 and the inverting input terminal B1. This adjusts the voltage at the inverting input terminal B1. The voltage at the non-inverting input terminal A1 is lower than the power supply voltage VCC by voltage Vd. Thus, in the same manner, the voltage at the inverting input terminal B1 is lower than the power supply voltage VCC by voltage Vd.

As a result, when ripple is produced in the power supply voltage VCC and causes the power supply voltage VCC to fluctuate, the voltages at the non-inverting input terminal A1 and the inverting input terminal B1 follow the fluctuation. In this case, the lowpass filter LPF arranged between the gate terminal VG1 and the gate terminal VG2 of the transistor M2 eliminates high frequency components. This applies voltage from which the ripple has been eliminated to the gate terminal VG2. Thus, the output voltage VOUT does not include noise.

The characteristics of the transistor M2 may vary when the ambient temperature changes. For example, the threshold value of the transistor M2 may vary. In such a case, the transistor M1 and the transistor M2 have equivalent characteristics. Thus, the threshold value of the transistor M1 also varies in the same manner.

When the characteristics of the transistor M1 vary, the output of the operational amplifier OP is adjusted so that the voltage at the inverting input terminal B1, which is connected to the dummy load DL, becomes equal to the voltage at the non-inverting input terminal A1. That is, the output voltage of the operational amplifier OP changes the voltage at the gate terminal VG1 so as to cancel the characteristic variation of the transistor M1. In this case, the change in the voltage at the gate terminal VG1 is transmitted to the gate terminal VG2 via the lowpass filter LPF. This changes the voltage applied by the gate terminal VG2 to the transistor M2 so as to maintain the output voltage VOUT at a constant value (VCC−Vd). Thus, the output voltage VOUT compensates for temperature changes, enables output with constant characteristics, and maintains the desired drop voltage Vdrop.

The first embodiment has the advantages described below.

(1) In the first embodiment, the transistor M2, which controls the supply of power, is connected to the voltage VCC line. Further, the load L of the driving subject is connected between the transistor M2 and the ground GND line. The transistor M1 and the dummy load DL are connected in series between the power supply voltage VCC line and the ground GND line. The dummy load DL realizes with the transistor M1 the voltage relationship that is the same as that between the transistor M2 and the load L. The inverting input terminal B1 of the operational amplifier OP is connected between the transistor M1 and the dummy load DL. The power supply terminal of the operational amplifier OP is connected to the power supply voltage VCC line, and the ground terminal of the operational amplifier OP is connected to the ground GND line. The non-inverting input terminal A1 of the operational amplifier OP is connected to the power supply voltage VCC line via the drop voltage setting power supply for the voltage Vd. The gate terminal VG1 of the transistor M1 is connected to the gate terminal VG2 of the transistor M2 via the lowpass filter LPF. Thus, high frequency components are eliminated by the lowpass filter LPF. Further, voltage from which ripple has been eliminated is applied to the gate terminal VG2 of the transistor M2. Thus, the output voltage VOUT does not include noise.

Further, when changes in the ambient temperature varies the characteristics of the transistor M2, the threshold value of the transistor M1 is varied in the same manner since the transistor M1 and the transistor M2 have equivalent characteristics. When the characteristics of the transistor M1 is varied, the output of the operational amplifier OP is adjusted so that the voltage at the inverting input terminal B1 becomes equal to the voltage at the non-inverting input terminal A1. Thus, the voltage at the gate terminal VG1 changes so as to cancel the characteristic variation. The changed voltage is supplied to the gate terminal VG2 via the lowpass filter LPF. As a result, the voltage applied to the gate terminal VG2 changes so as to maintain the output voltage VOUT at a constant value (VCC–Vd). Thus, the output voltage VOUT compensates for temperature changes, enables output with constant characteristics, and maintains the desired drop voltage Vdrop. Since ripple is eliminated in a state in which characteristic variations are compensated for, the ripple is efficiently eliminated, and the driving of the driving subject is ensured.

Furthermore, in the circuit configuration of the present embodiment, the lowpass filter LPF, the transistor M2, and the load L are excluded from an output feedback loop of the operational amplifier OP. With such a configuration, the effect of phase rotation does not have to be taken into consideration. This provides designing flexibility. For example, when the reactance component of the load is large or when using a high-order lowpass filter LPF having a large delay, other characteristics are not affected.

(2) In the present embodiment, the transistors M1 and M2 are formed by N-channel depression type MOS transistors having similar characteristics. Thus, even when the power supply terminal of the operational amplifier OP is connected to the power supply voltage VCC or even when the operational voltage margin of the driving subject is small, the transistor M2 may be operated to generate and supply the driving subject with the desired output voltage VOUT.

(3) In the present embodiment, the transistors M1 and M2 are located near each other. Thus, when manufactured through processes under similar conditions, the physical values of the transistor M1 and M2 are approximate to each other. Accordingly, this further properly compensates for the characteristics of the transistor M2, which is connected in series to the driving subject.

(4) In the present embodiment, the transistor M1 is smaller in size than the transistor M2. Further, the dummy load DL is set at a value that substantially realizes with the transistor M1 the voltage relationship between the transistor M2 and the load L. Thus, the dummy load DL causes the current flowing through the transistor M1 to be less than the current flowing through the transistor M2. Since the current flowing through the line between the transistor M1 and the dummy load DL is small, the power consumption is lowered.

Figure 2:
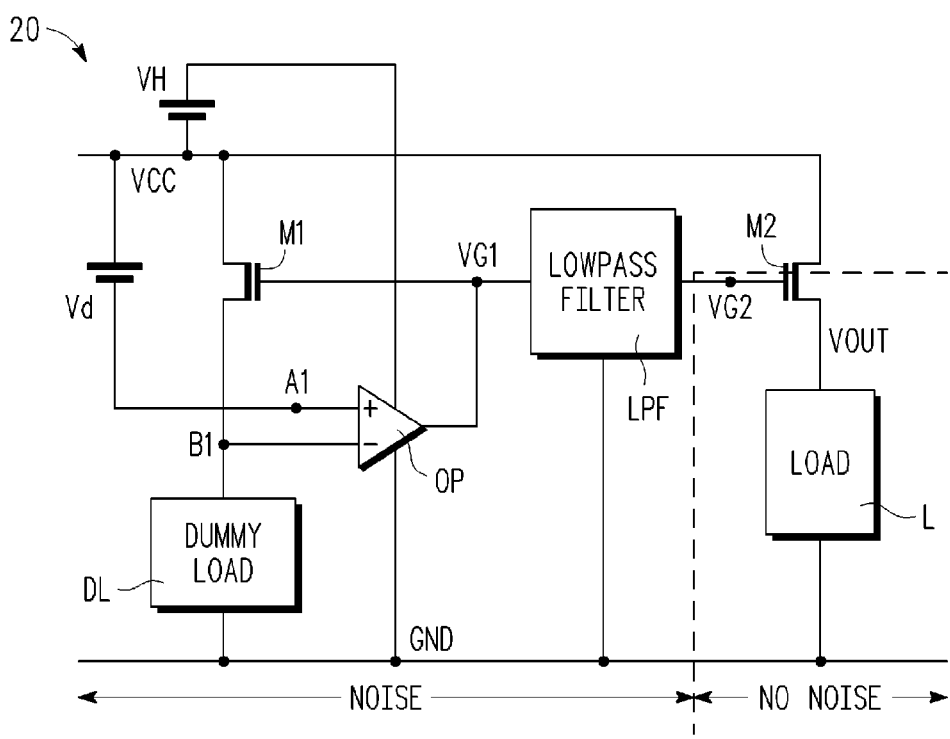
FIG. 2 is a circuit diagram of a ripple filter circuit according to a second embodiment of the present invention.
Figure 3A:
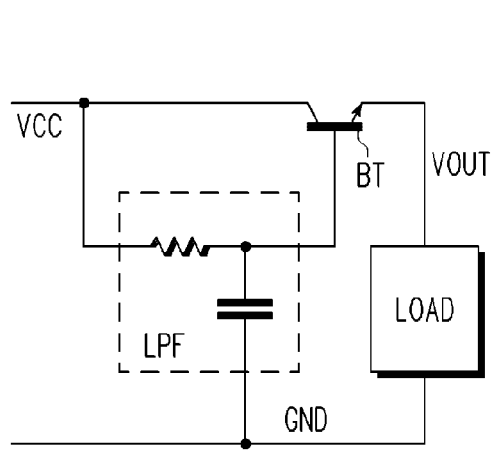
FIG. 3A is a circuit diagram of a ripple filter circuit in the prior art.
Figure 3B:
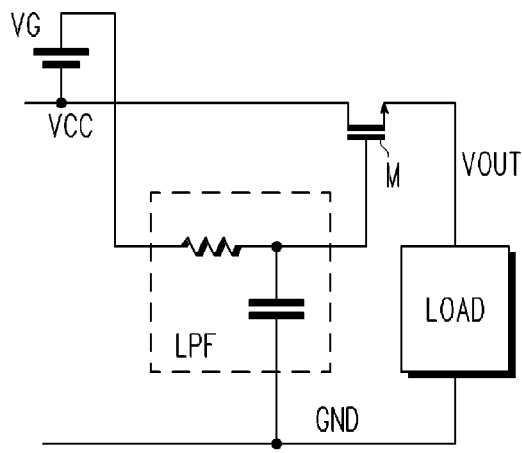
FIG. 3B is a circuit diagram of a ripple filter circuit that increases the drop voltage in the prior art.
Figure 4:
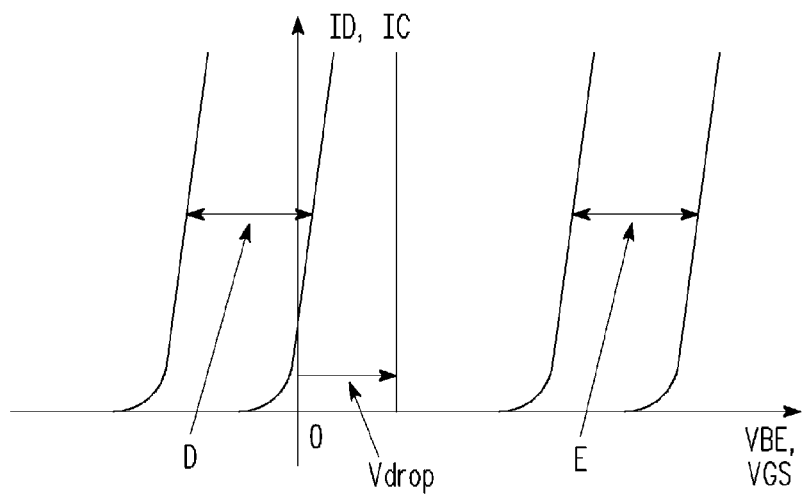
FIG. 4 is a graph showing the drop voltage and variation in different types of MOS transistors.

A second embodiment of the present invention will now be described with reference to FIG. 2. To avoid redundancy, like or same reference numerals are given to those components that are the same as the corresponding components of the first embodiment. Such components will not be described in detail.

In the second embodiment, a ripple filter circuit 20 uses enhancement type transistors M1 and M2 in lieu of the depression type transistors M1 and M2 of the first embodiment. Due to the use of the enhancement type transistors M1 and M2, the voltage at the power supply terminal of the operational amplifier OP is higher than the power supply voltage VCC by voltage VH. More specifically, the power supply terminal of the operational amplifier OP is connected to the power supply voltage VCC line via a high voltage adjustment power supply having voltage that is higher by voltage VH.

The second embodiment operates in the same manner as the first embodiment. Thus, the second embodiment has advantages (1), (3), and (4) of the first embodiment. Additionally, the second embodiment has the advantage described below.

(5) In the present embodiment, the transistors M1 and M2 are formed by N-channel enhancement type MOS transistors having similar characteristics. Further, voltage higher than the power supply voltage VCC by the voltage VH is applied to the power supply terminal of the operational amplifier OP. Thus, even when using enhancement type MOS transistors that do not operate unless voltage is applied to the gate terminals or even when the operational voltage margin of the driving subject is small, the transistor M2 may be operated to generate and supply the driving subject with the desired output voltage VOUT.

It should be apparent to those skilled in the art that the present invention may be embodied in many other specific forms without departing from the spirit or scope of the invention. Particularly, it should be understood that the present invention may be embodied in the following forms.

In each of the above embodiments, the power supply voltage VCC is higher than the voltage at the ground GND line. Instead, the power supply voltage VCC may be lower than the voltage at the ground GND line. In this case, P-channel MOS transistors are used as the transistors M1 and M2, the positive and negative sides of the voltages Vd and VH are reversed, and the non-inverting input terminal A1 and inverting input terminal B1 of the operational amplifier are reversed. This obtains the same advantages even for negative power supply voltage VCC.

In each of the above embodiments, the lowpass filter LPF, which is used in the ripple circuits 10 and 20, includes a resistor and a capacitor. However, the present invention is not limited in such a manner, and the lowpass filter may be formed by other devices, such as an inductor.

In each of the above embodiments, the load L is only for one driving subject. However, the present invention is not limited in such a manner, and the ripple filter circuit may connect a plurality of driving subjects having the same kind of loads L. In this case, the circuit configuration rightward to the lowpass filter LPF in FIGS. 1 and 2 is provided as in a plurality. More specifically, a plurality of lines connecting a driving subject of a load L and a transistor M2 are arranged between the power supply voltage VCC line and the ground GND line. The gate terminal VG2 of each of the transistors M2 is connected to the gate terminal VG1 of the transistor M1 via the lowpass filter LPF. In this case, characteristic variations in the plurality of transistors M2 are simultaneously compensated for.

The present examples and embodiments are to be considered as illustrative and not restrictive, and the invention is not to be limited to the details given herein, but may be modified within the scope and equivalence of the appended claims.

What is claimed is:

1. A ripple filter circuit for eliminating ripple, the ripple filter circuit comprising:
   a driving transistor, connected to a power supply line, for supplying output voltage to a driving subject connected to a ground line;
   a reference transistor and a dummy load connected in series between the power supply line and the ground line, wherein the reference transistor functions as a replica of the driving transistor, and the dummy load corresponds to load of the driving subject;
   a compensation circuit, connected to a gate terminal of the reference transistor, for canceling a characteristic variation in the reference transistor, wherein the compensation circuit provides its output to a gate terminal of the drive transistor via a low pass filter.

2. The ripple filter circuit according to claim 1, wherein:
   the compensation circuit includes a drop voltage setting power supply and an operational amplifier connected to the power supply line;
   the operational amplifier includes input terminals connected to a connection node between the reference transistor and the dummy load and to one of connection nodes of the drop voltage setting power supply; and
   the operational amplifier includes an output terminal connected to the gate terminal of the reference transistor.

3. The ripple filter circuit according to claim 2, wherein the drive transistor and the reference transistor are depression type MOS transistors.

4. The ripple filter circuit according to claim 2, wherein the drive transistor and the reference transistor are enhancement type MOS transistors, the ripple filter circuit further comprising:
   a voltage adjustment power supply for applying voltage that is higher than or lower than the voltage at the power supply line to the power supply terminal of the operational amplifier in order to drive the driving transistor or the reference transistor.

5. The ripple filter circuit according to claim 1, wherein the reference transistor is arranged near the driving transistor.

6. The ripple filter circuit according to claim 1, wherein:
   the reference transistor is smaller in size than the drive transistor; and
   the dummy load and the load of the driving subject has a relationship equivalent to that of the drive transistor and the reference transistor.

* * * * *